United States Patent [19]

Trautmann

[11] 4,061,060
[45] Dec. 6, 1977

[54] AUTOMATIC MULTISPINDLE TURNING LATHE

[75] Inventor: Günther Trautmann, Kirchheim-Nabern, Germany

[73] Assignee: Index-Werke KG Hahn & Tessky, Germany

[21] Appl. No.: 674,550

[22] Filed: Apr. 7, 1976

[30] Foreign Application Priority Data

Apr. 22, 1975 Germany ............................. 2517759

[51] Int. Cl.² ........................... B23B 3/30; B23B 9/00
[52] U.S. Cl. ......................................................... 82/3
[58] Field of Search ................................... 82/3, 24 R

[56] References Cited
U.S. PATENT DOCUMENTS 2,471,074  5/1949  Miller et al. ............................. 82/3 X
3,344,694  10/1967  White ......................................... 82/3
3,604,293  9/1971  Foll et al. ............................. 82/24 R
3,744,355  7/1973  Flisch ......................................... 82/3

FOREIGN PATENT DOCUMENTS 1,384,846  2/1975  United Kingdom ...................... 82/3
1,373,152  11/1974  United Kingdom ...................... 82/3

Primary Examiner—Leonidas Vlachos
Attorney, Agent, or Firm—Olsen and Stephenson

[57] ABSTRACT

Apparatus is disclosed relating to improvements in the construction and arrangement of cross-carriage assemblies carrying tool holders for use in conjunction with associated spindles carried on a rotary multispindle drum of the lathe. A plurality of arrangements are disclosed, all of which provide improved chip removal and greater access to the work space and tool holders.

11 Claims, 4 Drawing Figures

AUTOMATIC MULTISPINDLE TURNING LATHE

BACKGROUND OF THE INVENTION

The invention concerns an automatic multispindle turning lathe in which at least one cross-carriage carrying a tool holder is associated with at least one of the working spindles supported in a horizontally supported switchable spindle drum, each cross-carriage being movably guided in a guide body of a cross-carriage assembly provided on the bearing housing of the spindle drum.

In a known practical version of an automatic multispindle turning lathe of the initially mentioned type, the guide bodies of the individual cross-carriage assemblies carrying the cross-carriages form consoles built onto the bearing housing of the spindle drum. The cross-carriage assemblies are arranged symmetrically to the vertical, those for the lower working spindle pair being located in the horizontal plane and those for the center and upper working spindle pair being provided on each side in planes which are parallel to each other and in oblique position, the carriage assemblies being movable.

This type of carriage arrangement results in the cross-carriages being mounted partly on the underside of the bearing consoles of the cross-carriage assemblies, so that their turning tool holders must be suspended on the underside of these cross-carriages. This results in different working directions of the tools, which in turn requires different mounting positions of the latter on the turning tool holders, which is of particular disadvantage for a preadjustment of the turning tools (see the book "Automatic Turning Lathes" by Dr. H. Jager, p. 250).

In another machine design which is part of the state of the art, attempts have now been made to remedy the disadvantage resulting from the preadjustment of the turning tools by their different mounting positions by having all cross-carriage assemblies arranged at identical angular distances and in such a way that the path of tool displacement is located in planes passing through the respective spindle center and spindle drum center and the cross-carriages of the individual cross-carriage assemblies in the circumferential direction are each located on the same side of these planes. Although this measure allows the location of all turning tools in the tool holders at the same level, the cross-carriages in this design must also be provided below the consoles bearing them or in such planes that access to the tools of the rear lower as well as the front upper cross-carriage, for example, is difficult or unfavorable. Furthermore, this design makes it necessary to provide a cross-carriage in a zone of the machine working space where the chips drop down, with an unfavorable effect on chip removal.

The same disadvantages also exist with a cross-carriage arrangement according to German Utility Model Pat. No. 7,408,962, for it also requires a partly suspended arrangement of turning tools which not only requires different mounting positions but also results in difficult access to the tools and which requires the installation of a lower cross-carriage assembly in such a zone that the chips produced are hindered from removal from the working area.

SUMMARY OF THE INVENTION

This invention has as one object, to provide a construction and arrangement of cross-carriage assemblies which allows a constant mounting position of the turning tools for all cross-carriages on an automatic multispindle turning lathe and allows a rapid and simple change of the tools as well as unhindered chip removal.

According to the invention, this objective is realized by the fact that the tool holders of the cross-carriages of the cross-carriage assemblies are located on their front ends turned toward their respective working spindles and that the direction of displacement of the cross-carriages together with tools essentially is oriented toward the spindle center of the respective working spindle.

The special arrangement of tool holders on the cross-carriages as well as their selected direction of displacement provide the prerequisites that the same conditions for turning tool arrangement and their favorable handling are provided for all cross-carriages on one hand, and that a compact construction of the cross-carriage assemblies is possible, on the other hand, which no longer results in a cross-carriage arrangement with an unfavorable influence on chip removal.

The above-described known cross-carriage arrangements have an additional important disadvantage in the fact that the tool holder must be arranged so as to be movable and fixable in guide grooves of the cross-carriages parallel to the axis of the working spindle, so that the tool holders can be positioned at any desired point over the entire area to be subjected to transverse machining. Accordingly, consoles and cross-carriages of the cross-carriage assemblies must have a sufficient width in order to provide the necessary adjustment range of the turning tool holder with adequate stability. The necessary overall width of the cross-carriage at the same time is a considerable obstacle to chip removal and represents a further obstruction to access to the working space and tool holders.

These disadvantages and difficulties can be avoided by the design of the invention by the fact that the guide body of the cross-carriage assemblies in the bearing housing is displaceable and fixable in axially-parallel direction to the working spindles, for which purpose it will be of advantage to use a conventional drive system provided in the bearing housing of the spindle drum.

As a result, the width of the cross-carriages and guide bodies or the cross-carriage assemblies as a whole can be kept very small or narrow, so that their width dimensions are essentially limited to the machining site. Consequently, the room needed otherwise for the usual adjustment range of the tool holder on the cross-carriage has been made available for chip removal. The displaceability of the cross-carriage assemblies as a whole offers a further advantage that the respective displacement equipment can now also be used for longitudinal turning, so that longitudinal turning work can be performed with the cross-carriage assemblies, which was not possible in the prior art. Auxiliary drives which otherwise would have to be passed through the working space can be omitted.

In a preferred practical version, the cross-carriages are guided within the guide bodies designed as guide housings and their tool holder is exchangeably located in the front end of the cross-carriages. This design allows a particularly compact construction of cross-carriage assemblies. It results in a favorable design when the cross-carriages are formed by the piston rod, which is guided in the guide housing, of a hydraulically driven piston guided in a barrel of the guide housing, so that the drive shafts to drive the cross-carriages can be omitted. To the extent to which the invention is applied to automatic multispindle turning lathes in which the upper and lower working spindle pair are located in a horizontal plane after each switching of the spindle drum, a favorable cross-carriage arrangement results if at least the cross-carriages of the cross-carriage assemblies assigned to the two working spindles which are at the top after each switching of the spindle drum are displaceably arranged side-by-side and parallel to each other. To the extent to which one cross-carriage assembly is assigned to all working spindles, the parallel arrangement of the cross-carriages assigned to the upper two working spindles results in a relatively large distance to the neighboring cross-carriage assemblies, so that the working space of the turning machine becomes very simple and accessible. Furthermore, this parallel arrangement of cross-carriage assemblies allows the assignment of further cross-carriage assemblies to the other spindles, so that working piece machining can be divided into several passes at the individual stations. In this case, for example, longitudinal and flat-face operations can be performed, where otherwise only one plunge-cutting operation is possible. Furthermore, the possibility of dividing machining into several working passes results in simpler shapes of the turning tools which are also better suited for preadjustment. The cross-carriage arrangement of the invention furthermore allows the installation of automatic workpiece handling equipment and still permits a larger number of cross-carriage assemblies. For example, if two cross-carriage assemblies are to be assigned to several working spindles, these will be arranged at an acute angle, where it is of advantage for every conceivable arrangement of cross-carriage assemblies if their cross-carriages have the same angular ddistance of, preferably, 30° with respect to the planes passing through the axes of diametrically opposite working spindles. In this connection it is also of advantage if one of the two cross-carriages assigned to the working spindles at an acute angle is arranged to be displaceable parallel to one cross-carriage of two cross-carriage assemblies assigned to a neighboring working spindle.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
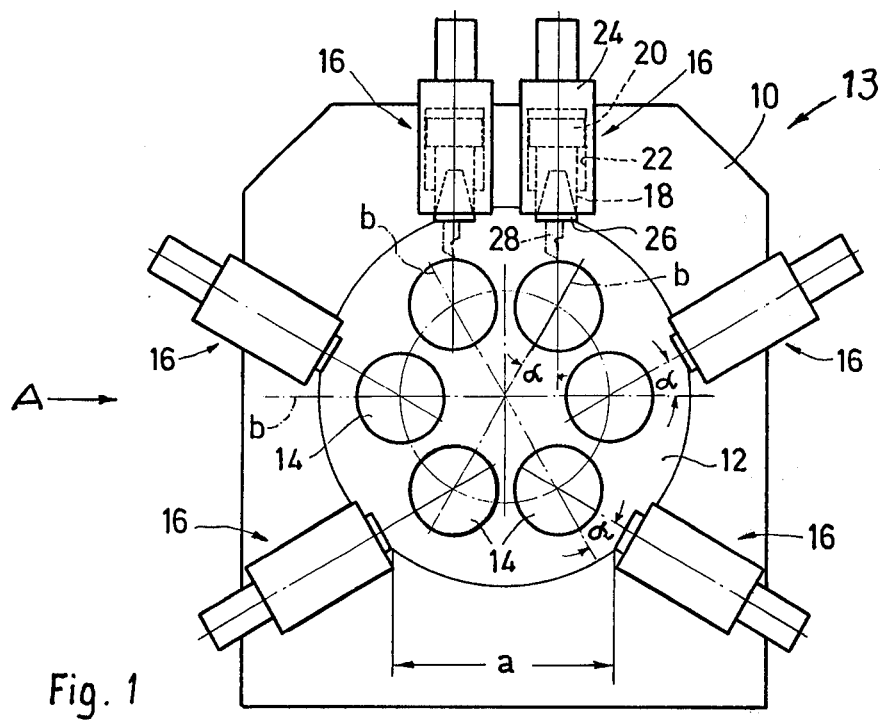
FIG. 1 is a schematic front elevational view of a six-spindle drum of an automatic multispindle turning lathe, with one cross-carriage assembly being assigned to each working spindle.
Figure 2:
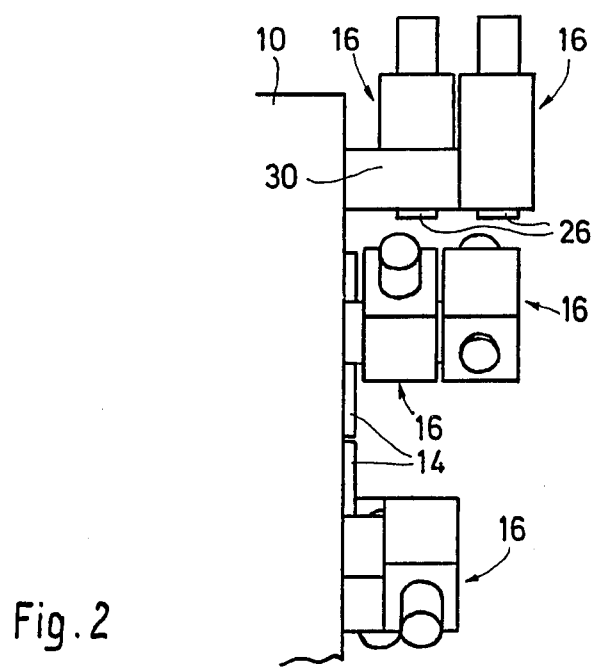
FIG. 2 is a fragmentary side elevational view of the carriage arrangement according to FIG. 1 seen in the direction of arrow A of FIG. 1.

In FIG. 1, No. 10 designates a bearing housing of a horizontally supported spindle drum 12 of an automatic multispindle turning lathe 13 in which, for example, six working spindles 14 are supported at equal angular distances so that they can be driven by conventional means (not shown) for turning about the drum axes to hold the drum in a fixed, preselected position. A cross-carriage assembly 16 is assigned to or is operatively associated with each working spindle. These are hydraulically driven, i.e. the acutal cross-carriage 18 comprises a piston rod of a piston 20 which is displaceably guided in a barrel 22 of a guide housing 24 forming the guide body of the cross-carriage 18. Two cylinder chambers of barrel 22 provided on opposite ends of piston 20 can be alternately connected with a hydraulic oil source (not shown) so that the cross-carriage 18 can be appropriately driven in either of the two axial directions. As is clearly shown in FIG. 1, a receiving cone is provided at the front-end of the cross-carriage 18, i.e. at the face-end of the piston rod projecting from the guide housing 24, an exchangeable tool holder 26 being provided in said cone. The cross-carriage assemblies 16 are assigned to the individual working spindles 14 in such a way that the direction of motion of each cross-carriage 18 together with the turning tool 28 inserted in the tool holder 26 is essentially oriented toward the respective spindle center of the corresponding working spindle 14. The arrangement of the tool holder 26 at the front end of each cross-carriage 18 as well as the described arrangement of the cross-carriage 18 and cross-carriage assembly 16 relative to the associated working spindle 14 allows free access to all tools of the individual cross-carriage assemblies 16 and furthermore maintains a free lower zone $a$ in the working space, so that the chips produced can drop down essentially without hindrance. The arrangement of the cross-carriage assemblies 16 is preferably made so that they have an angular dimension $a$ of about 30° relative to planes $b$ passing through the axes of diametrically opposite working spindles 14 as shown in FIG. 1.

Figure 3:
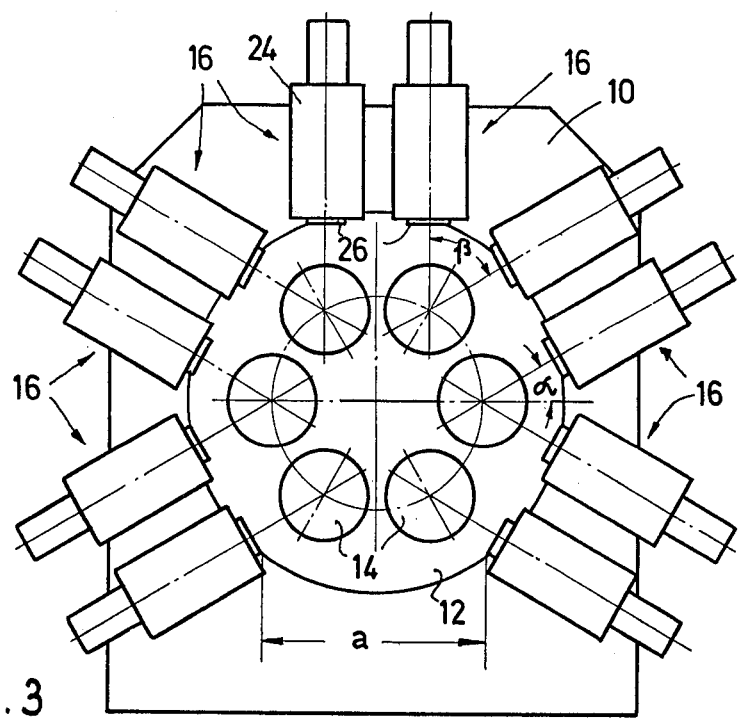
FIGS. 3 and 4 are schematic front elevational views of other possible variants of cross-carriage arrangements.
Figure 4:
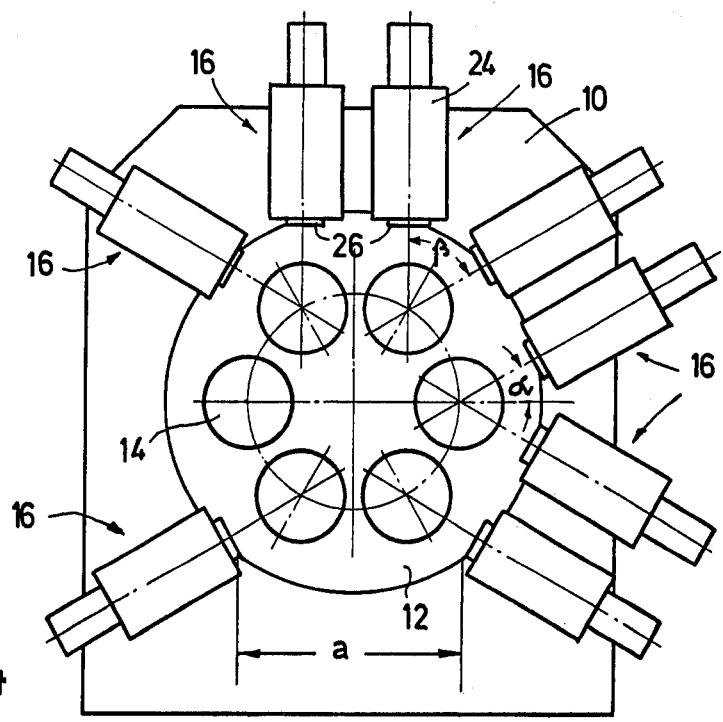

As indicated by FIGS. 1, 3 and 4, the spindle arrangements shown for an automatic multispindle turning lathe 13, represent those in which the respective upper and lower working spindle pair will be in a horizontal plane after each switching of the spindle drum 12. The arrangement of cross-carriage assemblies 16 shown in FIG. 1 consequently allows a relatively large angular distance between the individual assemblies, so that the two cross-carriage assemblies 16 associated with the upper two working spindles 14 are placed side-by-side in such a way that their cross-carriages 18 move parallel to each other. Consequently, a relatively large angular distance is realized between the other cross-carriage assemblies 16, so that all turning tools 28 of the individual cross-carriages 18 are readily accessible within the working space, and their arrangement at the front-end of the cross-carriages no longer requires overhead mounting and the same mounting position can be selected for all cross-carriages 18. Thus the same conditions are created for preadjusting the turning tools 28 of all cross-carriages 18.

The guide housing 24 of the individual cross-carriages 18 can be mounted directly to the face of the bearing housing 10, so that its cross-carriage 18 can move only radially relative to the axis of the assigned working spindle 14. In the present practical example, the cross-carriage assemblies 16, however, are adjustable in the bearing housing 10 for axial movement in a direction parallel to the working spindles 14 and can be fixed, for which purpose they are located at the front-end of a bearing member 30 provided in horizontally displaceable manner in the bearing housing. This bearing member 30 is preferably adjustable axially in both directions at an adjustable speed for the performance of a feed advance for longitudinal turning with the use of a drive system which is not shown in detail. The cross-carriage assemblies 16 thus also form longitudinal turning devices which preferably are provided on the bearing housing 10 so that they can also be pivoted and fixed.

In the schematic illustrations of the invention the specific details of construction for the feed movement of the carriage assemblies 16 parallel to the working spindles 14 and the pivotal movement of the carriage assemblies 16 have been omitted, because such details of construction are well known in the art, as is shown for example in the assignee's prior U.S. Pat. No. 3,604,293, patented Sept. 14, 1971, in the names of Gerhard Foll et al.

In the example of FIG. 3, cross-carriage assemblies 16 are assigned in pairs at an acute angle B to a part of the workin spindle 14 located in the spindle drum 12. In this practical version, paired cross-carriage assemblies 16 are assigned, for example, to the two upper and the two middle working spindles, while only one cross-carriage assembly is provided for each of the lower two working spindles. It can be seen that one of the two cross-carriage assemblies assigned to the working spindles at an acute angle is positioned relative to one of the cross-carriage assemblies of a neighboring working spindle in such a way that their cross-carriages 18 can be displaced parallel to each other.

In the practical example of FIG. 4, two cross-carriage assemblies 16 are assigned to each of the two upper and—as viewed from the front or operating side—the rear center working spindles 14 of spindle drum 12, while only one cross-carriage assembly is assigned to each of the lower two working spindles, and these latter two assemblies have an angular distance or preferably about 120°. Consequently, the middle working spindle present on the operating side remains free to feed a workpiece from that side.

It is claimed:

1. An automatic multispindle lathe comprising a bearing housing, a multispindle drum mounted in said housing with its axis and the axes of its spindles in parallel horizontal positions, a plurality of cross-carriage assemblies supported by said bearing housing in positions so as to be associated respectively with spindles of said drum, each cross-carriage assembly including a guide body and a cross-carriage with a longitudinal axis and guided for movement by said guide body along its longitudinal axis, the longitudinal axis of each cross-carriage being oriented to intersect the axis of its associated spindle, the front-end of each cross-carriage having a tool holder facing the associated spindle so that the direction of movement of the cross-carriage and its tool holder will intersect the axis of the associated spindle, two cross-carriage assemblies being operatively associated with at least one of said spindles with the longitudinal axes of the cross-carriages thereof being positioned relative to each other at an acute angle sufficient to enable their tool holders to be advanced simultaneously to the spindle.

2. The automatic multispindle turning lathe that is defined in claim 1, wherein said cross-carriage assemblies are mounted in said bearing housing so that they can be adjustably pivoted about axes parallel to the axes of said spindles and can be secured at the adjusted positions.

3. The automatic multispindle turning lathe that is defined in claim 1, wherein said cross-carriages are guided within said guide bodies, and said tool holders are removably mounted on the front ends of the cross-carriages.

4. The automatic multispindle turning lathe that is defined in claim 3, wherein each of said cross-carriage assemblies includes a hydraulic cylinder, the piston of said hydraulic cylinder having a piston rod which constitutes said cross-carriage and the rod-end of the cylinder constitutes said guide body.

5. The automatic multispindle turning lathe that is defined in claim 1, wherein the longitudinal axes of said cross-carriages are equiangularly displaced relative to planes passing through the axes of diametrically opposite spindles.

6. The automatic multispindle turning lathe that is defined in claim 5, wherein the equiangular displacement of said cross-carriage is about 30°.

7. The automatic multispindle turning lathe that is defined in claim 5, wherein said multispindle drum is rotatable about its axis to a plurality of preestablished positions, in each position of which a pair of upper and lower spindles are located in upper and lower horizontal planes, said cross-carriage assemblies associated with the upper pair of spindles being arranged to be displaceable parallel to one another.

8. The automatic multispindle turning lathe that is defined in claim 7, wherein at least one cross-carriage assembly is operably associated with each said spindle.

9. The multispindle turning lathe that is defined in claim 1, wherein one of said two cross-carriage assemblies is arranged relative to an adjacent cross-carriage assembly operatively associated with a next adjacent spindle so that said one cross-carriage assembly is in side-by-side relation with said adjacent cross-carriage assembly and their cross-carriages are displaceable in parallel relationship at the same angle of displacement relative to planes passing through the axes of diametrically opposite spindles.

10. The automatic multispindle turning lathe that is defined in claim 9, wherein said multispindle drum has six equiangularly positioned spindles, and wherein two cross-carriage assemblies are operatively associated with each of two upper spindles and one rearward central spindle, and two lower cross-carriage assemblies are each operatively associated respectively with one of the two lower spindles, the longitudinal axes of the cross-carriages of said two lower cross-carriage assemblies being angularly displaced about 120° from each other.

11. The automatic multispindle turning lathe that is defined in claim 9, wherein said multispindle drum has six equiangularly positioned spindles, and wherein two cross-carriage assemblies are operatively associated with each of two upper spindles and each of two central spindles, and one cross-carriage assembly is operatively associated with each of two lower spindles, the adjacent cross-carriage assemblies associated with adjacent spindles being in parallel relationship and at the same angle of displacement relative to planes passing through the axes of diametrically opposite spindles.

* * * * *